United States Patent
Kato

(10) Patent No.: US 9,096,008 B2
(45) Date of Patent: Aug. 4, 2015

(54) MOLD CLAMPING DEVICE AND INJECTION MOLDING MACHINE

(75) Inventor: Naoki Kato, Nagoya (JP)

(73) Assignee: MITSUBISHI HEAVY INDUSTRIES PLASTIC TECHNOLOGY CO., LTD., Nagoya-shi (JP)

( * ) Notice: Subject to any disclaimer, the term of this patent is extended or adjusted under 35 U.S.C. 154(b) by 0 days.

(21) Appl. No.: 14/365,548

(22) PCT Filed: Jan. 31, 2012

(86) PCT No.: PCT/JP2012/052061
§ 371 (c)(1),
(2), (4) Date: Jun. 13, 2014

(87) PCT Pub. No.: WO2013/114551
PCT Pub. Date: Aug. 8, 2013

(65) Prior Publication Data
US 2015/0044325 A1    Feb. 12, 2015

(51) Int. Cl.
*B29C 45/64* (2006.01)
*B29C 45/68* (2006.01)
*B22D 17/26* (2006.01)
*B29C 45/67* (2006.01)

(52) U.S. Cl.
CPC .............. *B29C 45/68* (2013.01); *B22D 17/263* (2013.01); *B29C 45/6728* (2013.01); *B29C 2045/688* (2013.01)

(58) Field of Classification Search
CPC ....................... B29C 45/6728; B29C 2045/688
USPC ................................................ 425/595, 451.9
See application file for complete search history.

(56) References Cited

U.S. PATENT DOCUMENTS

| 3,120,039 A | * | 2/1964 | Stubbe et al. | ................. 425/590 |
| 4,690,049 A | * | 9/1987 | Malashenko | ................. 100/214 |

(Continued)

FOREIGN PATENT DOCUMENTS

| DE | 200 06 618 | * | 9/2000 |
| JP | 60-159613 U | | 10/1985 |

(Continued)

OTHER PUBLICATIONS

International Search Report dated May 1, 2012, issued in corresponding International Application No. PCT/JP2012/052061 with English translation.

(Continued)

*Primary Examiner* — James Mackey
(74) *Attorney, Agent, or Firm* — Westerman, Hattori, Daniels & Adrian, LLP

(57) ABSTRACT

A mold clamping device includes a fixed platen on which a fixed mold is disposed, a movable platen on which a movable mold that defines a cavity along with the fixed mold is disposed, a tie bar configured to resist a mold clamping force that is generated between the fixed platen and the movable platen, and a half nut opening and closing device configured to grip the tie bar, thereby locking the movable platen and the tie bar, in which the half nut opening and closing device includes half nuts configured to grip the tie bars, an actuator which is disposed on the movable platen and configured to move the half nuts back and forth with respect to the tie bars, and a clevis configured to connect the actuator to the half nuts so as to allow the actuator to swing with respect to the gripping member.

10 Claims, 12 Drawing Sheets

(56) References Cited

U.S. PATENT DOCUMENTS

| | | | |
|---|---|---|---|
| 6,231,329 B1* | 5/2001 | Van Keuren, III | 425/595 |
| 6,733,275 B2* | 5/2004 | Fujita | 425/595 |
| 7,993,129 B2* | 8/2011 | Chiang | 425/595 |
| 2010/0173039 A1* | 7/2010 | Chiang | 425/592 |
| 2013/0129858 A1 | 5/2013 | Fujita et al. | |

FOREIGN PATENT DOCUMENTS

| | | |
|---|---|---|
| JP | 06-154989 A | 6/1994 |
| JP | 07-059369 B | 6/1995 |
| JP | 08-267522 A | 10/1996 |
| JP | 08-267523 A | 10/1996 |
| JP | 08-276475 A | 10/1996 |
| JP | 08-276482 A | 10/1996 |
| JP | 2002-264186 A | 9/2002 |
| JP | 2003-311796 | * 11/2003 |
| JP | 3524622 B2 | 5/2004 |
| JP | 3881850 B2 | 2/2007 |
| JP | 2009-132097 A | 6/2009 |
| JP | 2011-011379 A | 1/2011 |
| JP | 2011-011521 A | 1/2011 |

OTHER PUBLICATIONS

Written Opinion dated May 1, 2012, issued in corresponding International Application No. PCT/JP2012/052061 with English translation.

* cited by examiner

VIEW FROM A

MOLD CLAMPING DEVICE AND INJECTION MOLDING MACHINE

TECHNICAL FIELD

The present invention relates to a mold clamping device of an injection molding machine or a die cast molding machine, which is provided with a fixed platen, a movable platen, a tie bar connecting the movable platen and the fixed platen, and a mold clamping and retaining device retaining a mold clamping force by gripping the tie bar, and an injection molding machine.

BACKGROUND ART

As is well known, in molding machines such as an injection molding machine, there is a molding machine having a configuration in which a mold clamping force during molding (for example, injection molding) generated between a fixed platen on which a fixed mold is disposed and a movable platen on which a movable mold is disposed is retained by a tensile force of a tie bar.

In the molding machine having such a configuration, a mold clamping device having a configuration in which when the movable platen and the fixed platen are in a mold clamping state, a locking-shaped portion formed in the tie bar is gripped by a half nut or the like, thereby making the movable platen be retained on the fixed platen, is widely known (refer to, for example, PTL 1).

Further, in the molding machine having such a configuration, there is also a method of performing mold opening (hereinafter, referred to as mold release) by moving the tie bar in a direction in which the movable platen is opened, by driving the movable platen through the half nut by the tie bar in a state where the locking-shaped portion formed in the tie bar remains gripped by the half nut or the like, because a large mold opening force is required at the time of a mold opening operation to separate the fixed mold and the movable mold from a mold clamping state when extracting a molded article after resin is filled into a mold.

In this manner, in the mold clamping device to grip the tie bar by the half nut or the like, for example, as shown in FIG. 14, a connection mechanism 123 is used in which a flange 124 provided at a half nut 121 is pressed by a knuckle 125 of a tip portion of a rod 122 of an actuator (for example, a hydraulic cylinder), thereby fixing the actuator to the half nut. In this case, in order to fix the rod 122 to the half nut 121 without rattle, usually, connection is performed by the knuckle 125 and the flange 124 with a clearance 126 provided.

CITATION LIST

Patent Literature

[PTL 1] Japanese Patent No. 3881850

SUMMARY OF INVENTION

Problem to be Solved by the Invention

However, if a molding machine having such a configuration is operated for a long period of time, there is a case where fatigue breaking due to bending occurs in the rod 122 fixed to the half nut 121. Therefore, there is a strong demand for a technique capable of preventing the occurrence of bending damage of the rod of the actuator even if the molding machine is operated for a long period of time.

Therefore, the inventors of the present invention have extensively studied the cause of bending damage of a rod, with a hydraulic cylinder as an example, and as a result, have obtained the following knowledge.

First, in the half nut 121 configuring the mold clamping device, in a state where the half nut 121 is simply closed, as shown in FIG. 15, an axis line of the tie bar 115 and an axis line of the half nut 121 are parallel, as shown by a solid line. However, at the time of mold release, a force in a direction of an arrow P acts on the half nut 121, whereby the half nut 121 is separated from the tie bar on the side away from the fixed platen, and thus the angle between the two axis lines is occurred as shown by a two-dot chain line.

Further, although not shown in the drawing, at the time of mold clamping, four corners of the movable platen are pulled to the fixed platen side by the tie bar, whereby deflection in which a central portion of the surface on the side opposite to the fixed platen of the movable platen becomes convex is generated, and due to this deflection, the half nut which is in close contact with the movable platen is also inclined with respect to the actuator fixed to a central portion between two tie bars and provided at a position where deformation of the movable platen is small.

As a result, as shown in FIG. 16, a bending force is generated in a tip portion of the rod 122 fixed to the side surface of the half nut 121, thereby causing bending damage of the rod 122.

The present invention has been made in consideration of such knowledge and has an object to provide a mold clamping device which is provided with a movable platen, a tie bar connecting the movable platen and a fixed platen, and a mold clamping and retaining device transmitting and retaining a mold clamping force by gripping the tie bar and can prevent the occurrence of bending damage of a rod of an actuator even if a half nut is inclined with respect to the actuator at the time of molding, and particularly an injection molding machine.

Means for Solving the Problem

In order to solve the above-described problem, the present invention proposes the following means.

(1) According to an aspect of the present invention, there is provided a mold clamping device including: a fixed platen on which a fixed mold is disposed; a movable platen on which a movable mold that defines a cavity along with the fixed mold is disposed and which is allowed to move with respect to the fixed platen; a tie bar configured to resist a mold clamping force that is generated between the fixed platen and the movable platen; and a mold clamping and retaining device which configured to grip the tie bar, thereby locking the movable platen and the tie bar, in which the mold clamping and retaining device includes a gripping member configured to grip the tie bar, an actuator which is disposed on the movable platen or the fixed platen and configured to move the gripping member back and forth with respect to the tie bar, and a swinging member which is configured to connect the actuator and the gripping member so as to allow the actuator to swing with respect to the gripping member.

According to the mold clamping device related to the aspect of the present invention of the above (1), since the actuator and the gripping member are connected so that they can swing by the swinging member, the angle with respect to the actuator generated in the gripping member at the time of molding is cancelled. As a result, it is possible to prevent the occurrence of bending in a rod of the actuator due to the inclination of the gripping member. As a result, it is possible to prevent the occurrence of bending damage of the rod of the actuator.

(2) In the mold clamping device according to the above (1), the gripping member may include two sets of half nuts which are disposed corresponding to two tie bars and which can come into contact with and be separated from the respective tie bars and in each of which a second locking-shaped portion that meshes with a first locking-shaped portion formed in the tie bar is formed, and first and second gripping members each configured to connect half nut pieces in which the second locking-shaped portions respond to a movement in the same direction, among the two sets of half nuts, by a connection member, and the first gripping member and the second gripping member may be configured so as to grip the two tie bars in cooperation with each other.

According to the mold clamping device related to the aspect of the present invention of the above (2), two half nut pieces configuring the first gripping member and two half nut pieces configuring the second gripping member have rigidity of a connection structure. Further, since the half nut pieces configuring the first and second gripping members are connected by the connection member, thereby interfering with each other's angle, the occurrence of an angle between the two half nut pieces is prevented. As a result, it is possible to prevent the occurrence of bending damage of the rod of the actuator.

Further, the half nuts come into contact with and are separated from the respective tie bars in synchronization. As a result, in addition, since the first gripping members and the second gripping members simultaneously operate in synchronization, the occurrence of movement variation for each half nut is prevented, and thus the time required to complete the contact and separation of the half nut can be shortened and productivity can be improved.

Further, in a case where the first gripping member and the second gripping member are synchronized by a link or the like, since all the half nut pieces of the first gripping member and the second gripping member simultaneously operate in synchronization, movement variation for each half nut piece is eliminated, and thus the time required to complete the contact and separation of the half nut piece can be further shortened and productivity can be improved.

In this specification, the half nut also includes a half nut in which a circumferential convex portion protrudes radially inward of a hole without having a lead configuring a screw in the hole, in addition to a half nut in which a female screw is formed in a hole formed in a casing.

(3) In the mold clamping device according to the above (2), each of the first gripping member and the second gripping member may have two sets of connection members, and the connection members of the first gripping member and the connection members of the second gripping member may be disposed diagonally in a view of the connection member in an axial direction of the connection member.

According to the mold clamping device related to the aspect of the present invention of the above (3), since the connection members of the first gripping member and the connection members of the second gripping member are disposed diagonally, the occurrence of an angle of the respective half nut pieces with respect to the tie bar during contact and separation movement and at the time of completion of the movement is prevented.

As a result, it is possible to more stably prevent the occurrence of bending damage of the rod of the actuator.

(4) In the mold clamping device according to the above (2) or (3), the connection member may be a connecting rod.

According to the mold clamping device related to the aspect of the present invention of the above (4), it is possible to easily increase the bending rigidity of a connection structure which has a simple shape. As a result, it is possible to more stably prevent the occurrence of bending damage of the rod of the actuator.

(5) According to another aspect of the present invention, there is provided an injection molding machine including the mold clamping device according to any one of the above (1) to (4).

According to the injection molding machine related to the aspect of the present invention of the above (5), it is possible to prevent the occurrence of bending in the rod of the actuator due to inclination of the gripping member. As a result, it is possible to prevent the occurrence of bending damage of the rod of the actuator.

Effects of the Invention

According to the mold clamping device and the injection molding machine related to the present invention, since the actuator and the gripping member are connected so that the actuator is allowed to swing with respect to the gripping member, even in a case where inclination with respect to the actuator occurs in the gripping member, it is possible to prevent the occurrence of bending of the rod of the actuator. As a result, it is possible to prevent the occurrence of bending damage of the rod of the actuator.

DESCRIPTION OF EMBODIMENTS

Hereinafter, a first embodiment of the present invention will be described with reference to FIGS. 1 to 7.

Figure 1:
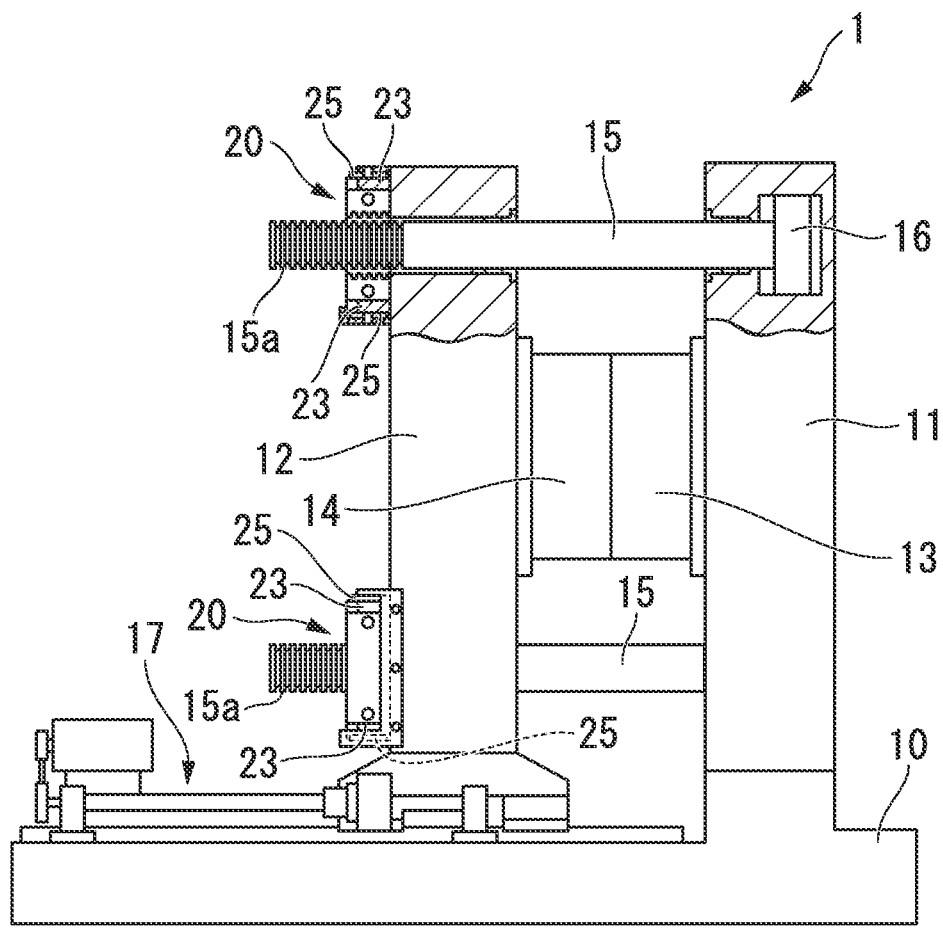
FIG. 1 is a partial cross-sectional side view showing an example of a schematic configuration of a mold clamping device of an injection molding machine describing an application example of a mold clamping device according to the present invention.
Figure 2:
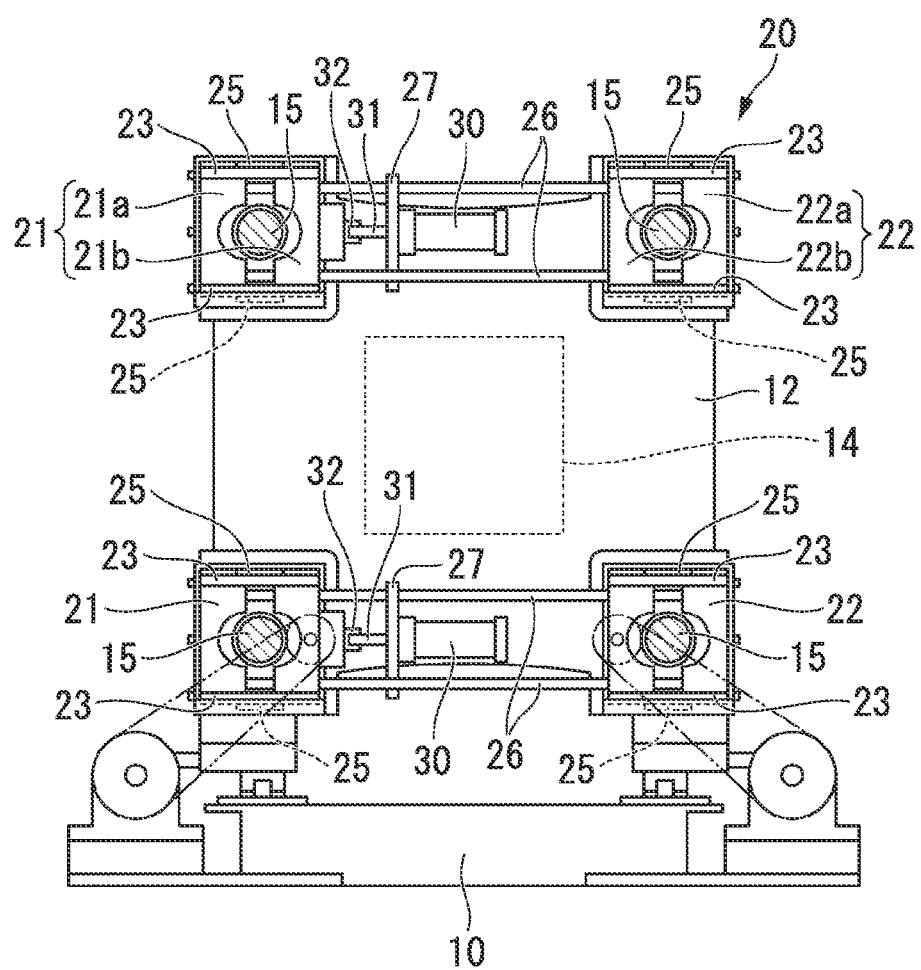
FIG. 2 is a diagram when the mold clamping device of an injection molding machine shown in FIG. 1 is viewed from the movable platen side.
Figure 3:
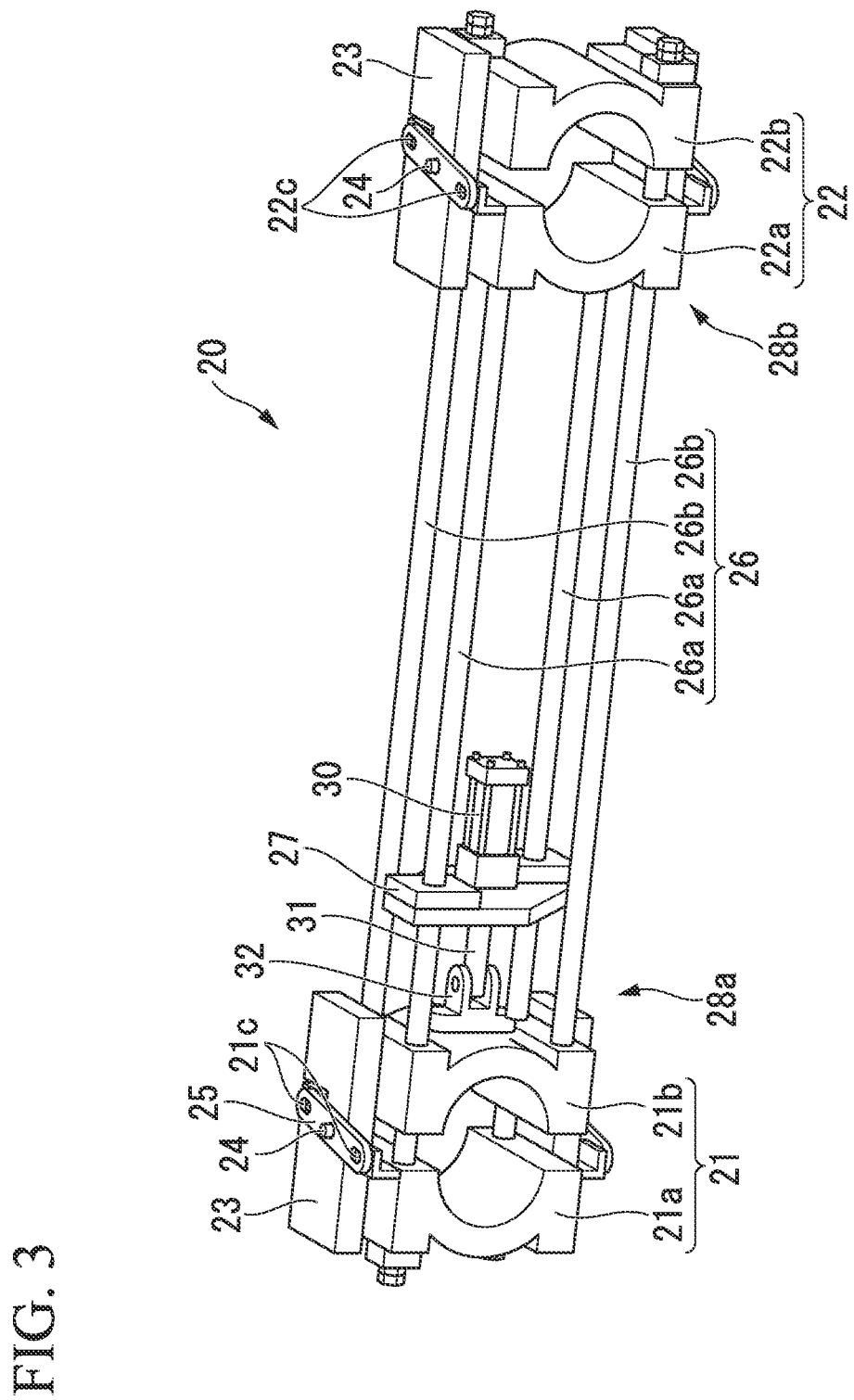
FIG. 3 is a perspective view showing a schematic configuration of a half nut opening and closing device according to a first embodiment of the present invention.

FIGS. 1 and 2 are diagrams showing a mold clamping device which is used in, for example, an injection molding machine according to the first embodiment, and reference numeral 1 denotes the mold clamping device. Further, FIGS. 3 to 7 are diagrams describing a half nut opening and closing device (a mold clamping and retaining device) 20.

The mold clamping device 1 is provided with a base 10 of a molding machine main body, a fixed platen 11, a movable platen 12, a tie bar 15, a movable platen moving means 17, and the half nut opening and closing device 20.

As shown in FIGS. 1 and 2, the fixed platen 11 is provided on one end side of the base 10, and the movable platen 12 is disposed so as to be able to slide with respect to the base 10 and to face the fixed platen 11.

A fixed mold 13 can be mounted on the fixed platen 11, a movable mold 14 can be mounted on the movable platen 12, and the fixed mold 13 and the movable mold 14 are made so as to define a cavity.

The fixed platen 11 and the movable platen 12 are connected by four tie bars 15 adjacent to each other in a horizontal direction and a vertical direction.

The four tie bars 15 are disposed to pass through the movable platen 12, and the movable platen 12 is made so as to be able to slide on the tie bars 15.

In the tie bar 15, a piston for mold clamping force generation 16 is provided on the fixed platen 11 side and a circumferential groove portion (a first locking-shaped portion) 15a is formed at an end portion on the side opposite to the fixed platen 11.

Further, the movable platen moving means 17 which is electrically powered, for example, is provided on the base 10, thereby being able to move the movable platen 12 with respect to the fixed platen 11. In this case, the movable platen moving means 17 may be a hydraulic cylinder. FIG. 1 shows a mold closing state where the movable mold 14 is brought into contact with the fixed mold 13 by moving the movable platen 12 in a direction of the fixed platen 11 by the movable platen moving means 17.

The half nut opening and closing device 20 is provided with a half nut 21, a half nut 22, a guide box 23, a link plate 25, and a connecting rod 26 and is provided in two upper and lower stages to correspond to two tie bars 15 and 15 on the upper side and two tie bars 15 and 15 on the lower side among the four tie bars 15, on the surface opposite to the movable mold 14 of the movable platen 12.

The half nut 21 is provided with a half nut piece 21a and a half nut piece 21b and is made so as to grip the tie bar 15 by making circumferential convex portions (second locking-shaped portions), which are formed in the half nut piece 21a and the half nut piece 21b and protrude radially inward, mesh with the circumferential groove 15a of the tie bar 15.

Further, the half nut 22 is provided with a half nut piece 22a and a half nut piece 22b and is made so as to grip the tie bar 15 by making circumferential convex portions (second locking-shaped portions), which are formed in the half nut piece 22a and the half nut piece 22b and protrude radially inward, mesh with the circumferential groove 15a of the tie bar 15.

The half nut pieces 21a and 21b and the half nut pieces 22a and 22b are respectively disposed so as to be able to slide in the horizontal direction (the right-left direction in FIG. 2), in the guide boxes 23 provided on the movable platen 12, are respectively connected through the link plates 25 each supported on the outside (the upper and lower surfaces) of the guide box 23, and are respectively made so as to rotate around fulcrum pins 24 protruding upward and downward at the center position of the tie bar 15.

As a result, the half nut pieces 21a and 21b and the half nut pieces 22a and 22b are made such that the movement thereof back and forth with respect to the tie bar 15 synchronizes.

Figure 4:
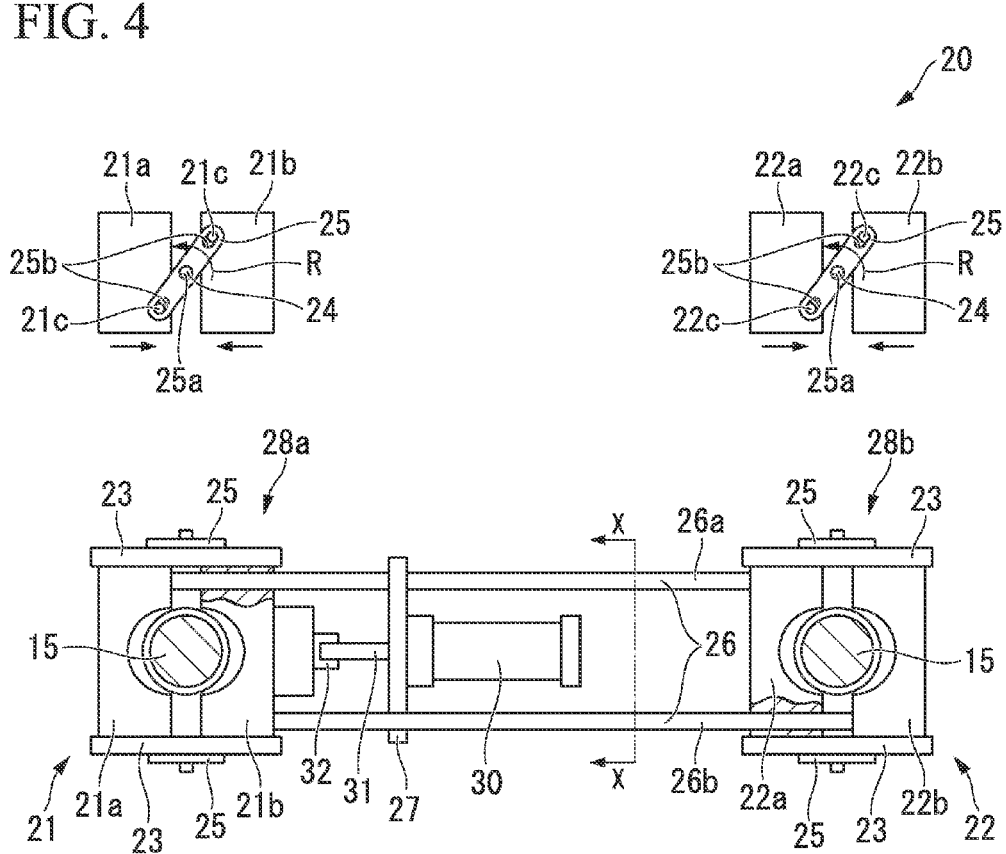
FIG. 4 is a front view and partial plan views describing a schematic configuration of the half nut opening and closing device according to the first embodiment and shows a state where a half nut is opened.
Figure 5:
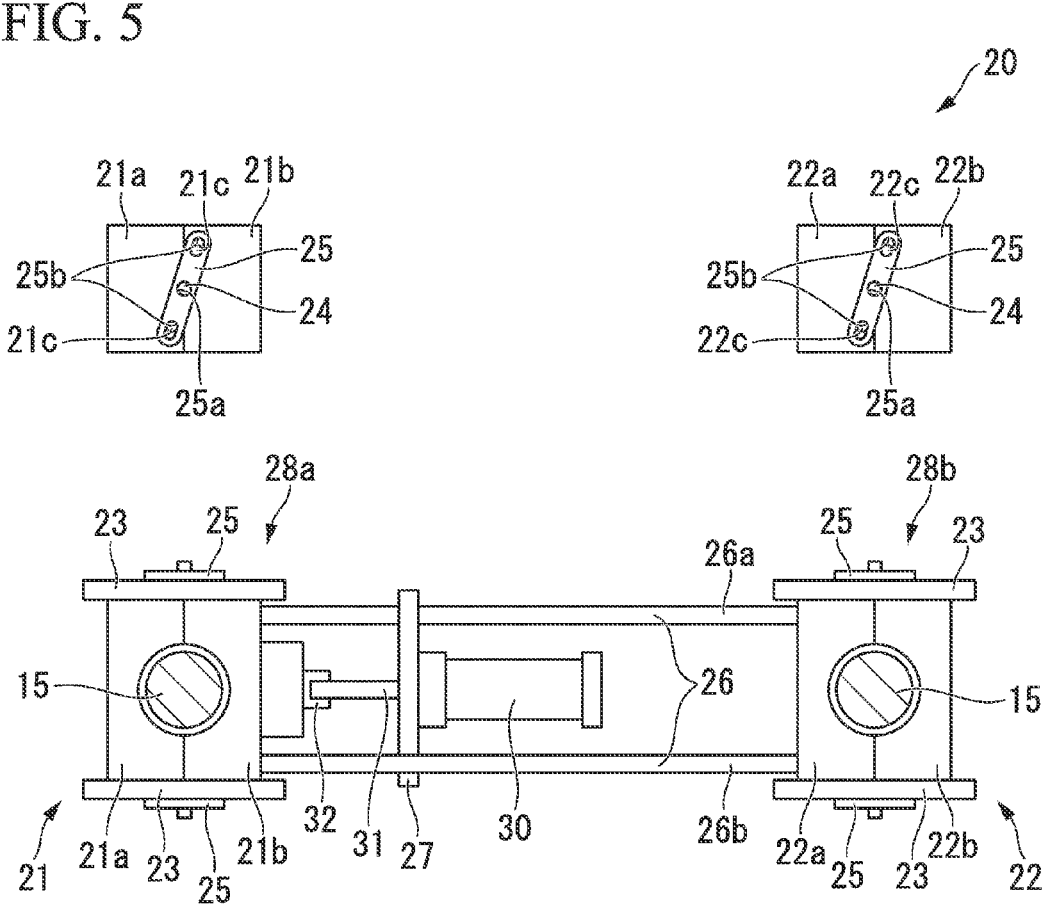
FIG. 5 is a front view and partial plan views describing the schematic configuration of the half nut opening and closing device according to the first embodiment and shows a state where the half nut is closed.
Figure 6:
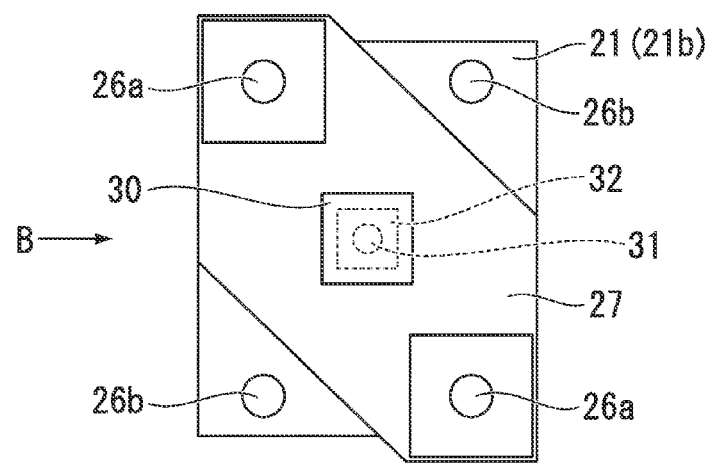
FIG. 6 is a diagram describing the disposition of a connecting rod of the half nut opening and closing device according to the first embodiment and a diagram as viewed from a direction of arrow X-X in FIG. 4.
Figure 7:
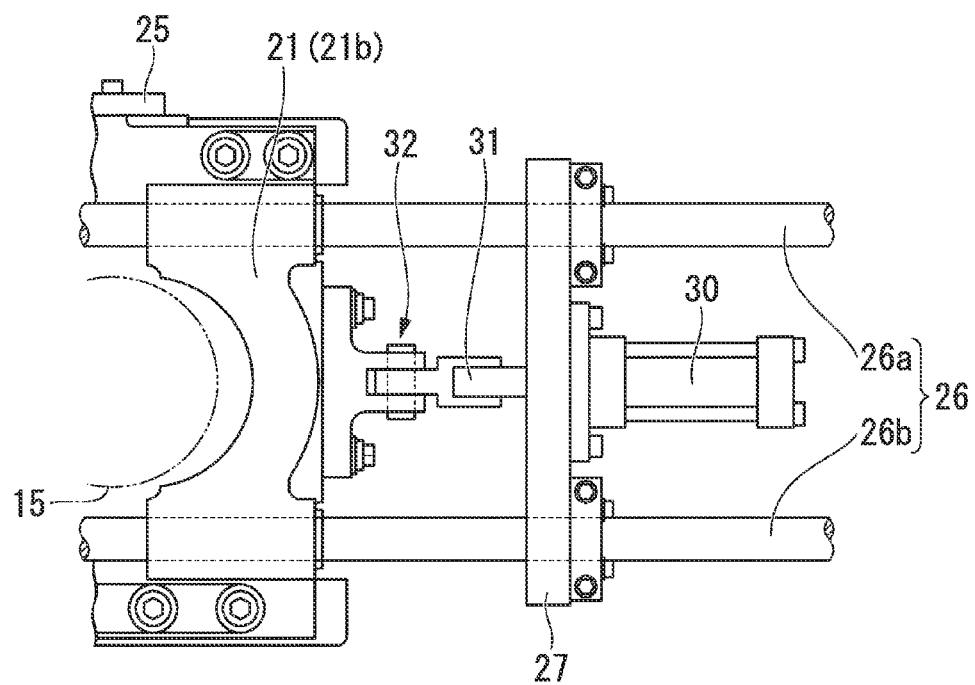
FIG. 7 is a diagram as viewed from a direction of arrow B-B in FIG. 6 showing a main section of the half nut opening and closing device according to the first embodiment.

Pins 21c are respectively provided to protrude upward and downward on the upper and lower surfaces of the half nut pieces 21a and 21b, as shown in FIGS. 4 and 5.

Further, pins 22c are respectively provided to protrude upward and downward on the upper and lower surfaces of the half nut pieces 22a and 22b.

In the link plate 25, a round hole 25a is formed at the center and two long holes 25b are formed at both end portions which are symmetrical with respect to the round hole 25a, and the fulcrum pin 24 protruding outward from the guide box 23 is inserted into the round hole 25a. In addition, in the drawings, the long hole 25b is shown in a rectilinear long hole shape. However, in consideration of the movement profile of the fulcrum pin 24, a long hole having a curved shape such as a bent shape is also acceptable.

Further, the upper and lower pins 21c of the half nut pieces 21a and 21b and the upper and lower pins 22c of the half nut pieces 22a and 22b are respectively inserted into the long holes 25b of both end portions. In addition, in the drawings, an example in which the link plate 25 is provided outside of the guide box 23 is shown. However, a configuration is also acceptable in which the link plate 25 is provided between the guide box 23 and the half nut.

The connecting rod 26 includes two first connecting rods 26a and two second connecting rods 26b and is disposed such that the first connecting rods 26a slidably pass through the half nut piece 21b and connect the half nut piece 21a and the half nut piece 22a and the second connecting rods 26b slidably pass through the half nut piece 22a and connect the half nut piece 21b and the half nut piece 22b.

In addition, the half nut piece 21a, the half nut piece 22a, and the two first connecting rods 26a connecting the half nut piece 21a and the half nut piece 22a configure a first gripping member 28a which operates the half nut piece 21a and the half nut piece 22a in synchronization with each other.

Further, the half nut piece 21b, the half nut piece 22b, and the two first connecting rods 26b connecting the half nut piece 21b and the half nut piece 22b configure a second gripping member 28b which operates the half nut piece 21b and the half nut piece 22b in synchronization with each other.

Further, a bracket 27 is provided on the connecting rod 26 between the half nut piece 21b and the half nut piece 22a, and a hydraulic cylinder (an actuator) 30 is mounted on the bracket 27. Further, the bracket 27 is fixed to the two first connecting rods 26a.

In the hydraulic cylinder 30, a rod 31 is connected to the half nut piece 21b through a clevis 32 having a rotation axis in the vertical direction, and thus, even in a case where an angle occurs in the half nut piece 21b, the angle is cancelled by the rotation of the clevis 32, whereby the occurrence of a bending force of the rod 31 is prevented.

Next, an operation of the half nut opening and closing device 20 will be described with reference to FIGS. 4 and 5.

FIG. 4 shows a front view in a state where the half nut opening and closing device 20 is opened and plan views of the half nuts 21 and 22, and FIG. 5 shows a front view in a state where the half nut opening and closing device 20 is closed and plan views of the half nuts 21.

First, when a mold is closed by the movable platen moving means 17, as shown in FIG. 4, the circumferential groove portions 15a of the tie bars 15 are disposed between the opened half nut 21 (half nut pieces 21a and 21b) and between the opened half nut 22 (half nut pieces 22a and 22b).

Next, when the rod 31 of the hydraulic cylinder 30 moves forth, the half nut piece 21b of the first gripping member 28a moves to the left side in the drawing, and due to a reaction force, the half nut piece 21a moves to the right side in the drawing through the bracket 27 to which the hydraulic cylinder 30 is fixed and the two first connecting rods 26a. At this time, since the half nut piece 22a and the half nut piece 21a are connected by the two first connecting rods 26a and the half nut piece 22b and the half nut piece 21b are connected by the two second connecting rods 26b, the half nut pieces 22a and 22b respectively move in the same direction as the half nut pieces 21a and 21b, thereby coming close to the tie bars 15 and 15.

At this time, as shown in FIG. 4, each of the link plates 25 connected to the half nuts 21 and 22 rotates in a direction of an arrow R around the fulcrum pin 24, and thus the half nut pieces 21a and 22a simultaneously come close to the tie bars 15 in synchronization with the half nut pieces 21b and 22b.

Subsequently, the half nut pieces 21a and 21b and the half nut pieces 21a and 21b respectively come close to the tie bars 15 in synchronization, whereby the half nuts 21 and 22 mesh with the circumferential groove portions 15a of the tie bars 15, thereby gripping the tie bars 15.

According to the half nut opening and closing device 20 related to the first embodiment, the hydraulic cylinder 30 and the half nut 21 are connected through the clevis 32, and thus the hydraulic cylinder 30 is made so as to be able to swing with respect to the half nut 21. As a result, even if the half nut piece 21b (the half nut 21) is inclined with respect to a direction in which the tie bar 15 extends, the angle between the half nut piece 21b and the direction is cancelled by its rotation around the axis of the clevis pin 32, whereby the action of a bending force on the rod 31 of the hydraulic cylinder 30 is prevented, and thus the occurrence of bending damage of the rod 31 of the hydraulic cylinder 30 is prevented.

In addition, a synchronization mechanism of the half nut by the link plate 25 and the support pin 24 can also be omitted for the purpose of cost reduction or the like. However, by synchronizing the half nuts 21a and 21b and the half nuts 22a and 22b by the respective link plates 25, it is possible to enable more reliable synchronization than in a case where only the first and second connecting rods 26a and 26b are provided.

Further, in this embodiment, a case is shown in which each of the rod members 26a and 26b is used as a connection member connecting the half nut pieces which move in the same direction. However, a configuration is also acceptable in which the half nut piece 21a and the half nut piece 22b moving toward the center of two tie bars and the half nut piece 21b and the half nut piece 22a moving outward from the center of two tie bars are respectively connected by, for example, link structures, whereby the half nuts 21 and 22 grip the tie bars. In addition, a configuration may also be made such that the half nut pieces moving toward the center of two tie bars and the half nut pieces moving outward from the center of two tie bars respectively move in synchronization by connection members, links, or other means.

Next, a mold clamping device according to a second embodiment of the present invention will be described with reference to FIG. 8.

Figure 8:
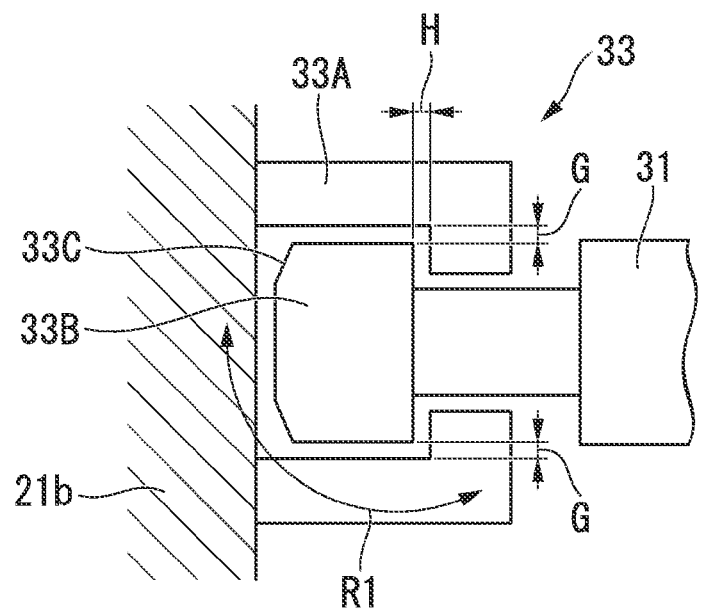
FIG. 8 is a diagram showing a swinging member constituting a half nut opening and closing device according to a second embodiment of the present invention.

FIG. 8 is a diagram when a connector 33 connecting the rod 31 of the actuator and the half nut piece 21b is viewed in a plane.

The second embodiment is different from the first embodiment in that, instead of the clevis 32, the connector 33 provided with a flange 33A and a knuckle 33B which is disposed in the flange 33A is used, and others have the same configurations as those of the half nut opening and closing device 20 according to the first embodiment.

In the connector 33, clearances G and H are set between the flange 33A and the knuckle 33B on both sides in the extension direction of the tie bar 15 and in the movement direction of the rod 31. As a result, the flange 33A is rotatable in a direction of an arrow R1, and thus, even if inclination occurs in the half nut piece 21b, the inclination is absorbed by the clearances G and H, whereby action of a bending force from the flange 33A to the rod 31 is suppressed.

In addition, if a chamfered portion 33C as shown in FIG. 8 or a corner R is provided on the tip side of the knuckle 33B, since rotation at a tip corner portion of the knuckle 33B is smoothly performed, the contact thereof with the flange 33A is further relieved, and thus it is more suitable.

Next, a mold clamping device according to a third embodiment of the present invention will be described with reference to FIG. 9.

The third embodiment is different from the first embodiment in that, instead of the clevis 32, a spherical joint 34 is used, and others have the same configurations as those of the first embodiment.

Figure 9:
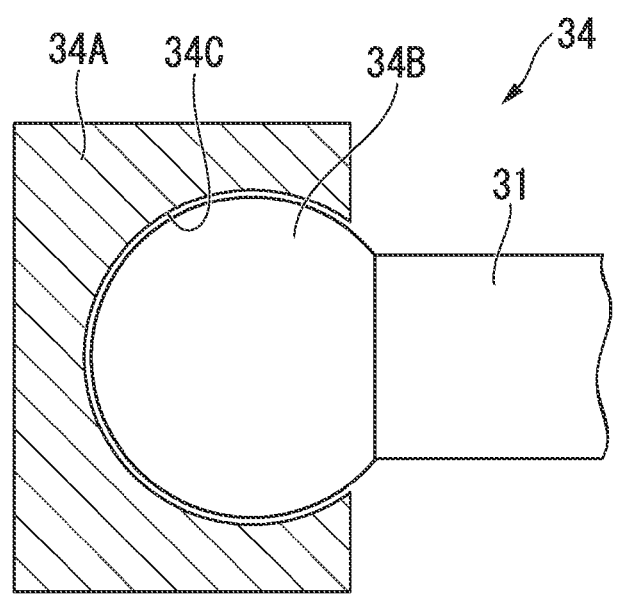
FIG. 9 is a diagram showing a spherical joint constituting a half nut opening and closing device according to a third embodiment of the present invention.

The spherical joint 34 is provided with a flange 34A and a knuckle 34B connected to the rod 31, as shown in FIG. 9, and a concave portion 34C which is formed of a portion of a spherical surface is formed inward at the flange 34A. The knuckle 34B has a portion of a spherical surface having a sphere radius equal to the sphere radius of the concave portion 34C or slightly smaller than the radius of the concave portion 34C so as to be able to slide in the concave portion 34C, and thus the knuckle 34B is inserted into the concave portion 34C, whereby the knuckle 34B can rotate with respect to the flange 34A without selecting a direction within a predetermined range.

As a result, even if the half nut piece 21b is inclined due to a complex movement, the inclination angle of the half nut piece 21b is cancelled by its rotation at the spherical joint 34, whereby the occurrence of a bending force in the rod 31 is prevented.

Next, a mold clamping device according to a fourth embodiment of the present invention will be described with reference to FIG. 10.

The fourth embodiment is different from the first embodiment in that, instead of the clevis 32, a universal joint 35 is used, and others have the same configurations as those of the first embodiment.

Figure 10:
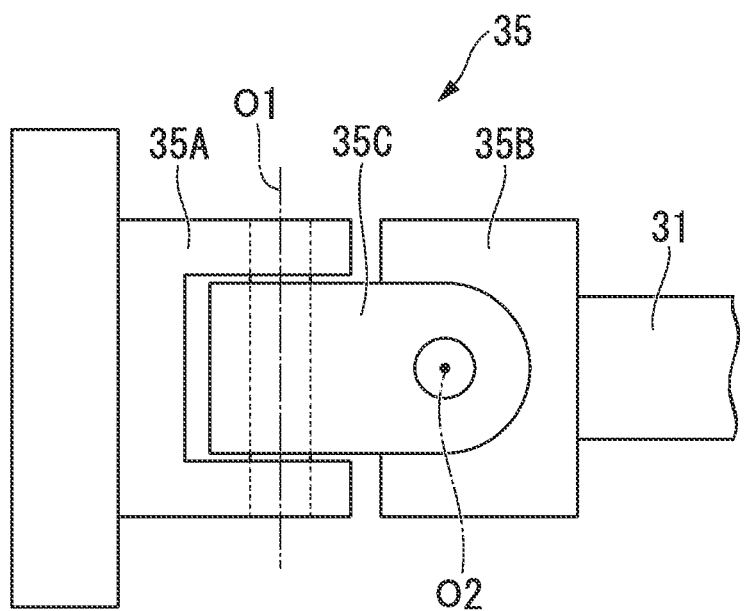
FIG. 10 is a diagram showing a universal joint constituting a half nut opening and closing device according to a fourth embodiment of the present invention.

The universal joint 35 is provided with a first flange 35A, a second flange 35B connected to the rod 31, and a connection member 35C connecting the first flange 35A and the second flange 35B, as shown in FIG. 10, and the first flange 35A and the connection member 35C are made so as to be able to rotate around an axis O1 and the second flange 35B and the connection member 35C are made so as to be able to rotate around an axis O2.

As a result, even if the half nut piece 21b is inclined through a complex movement, the angle of the half nut piece 21b is cancelled by its rotation at the connection member 35C, whereby the occurrence of a bending force of the rod 31 is prevented.

Figure 11A:
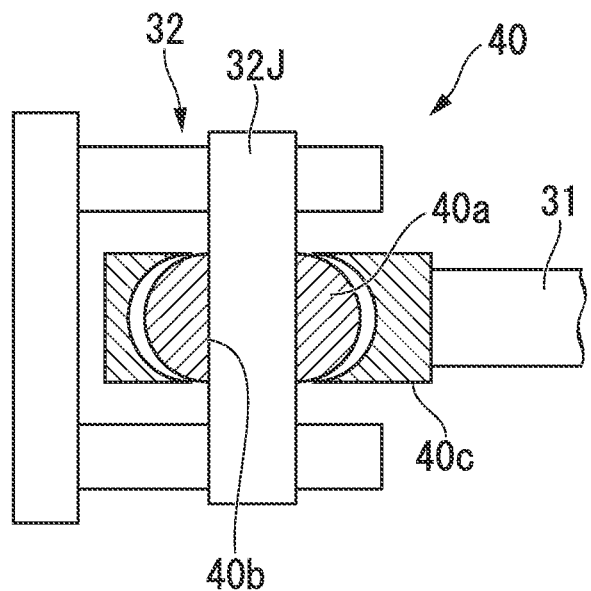
FIG. 11A is a diagram showing a spherical bush constituting a half nut opening and closing device according to a fifth embodiment of the present invention.

Next, a mold clamping device according to a fifth embodiment of the present invention will be described with reference to FIGS. 11A and 11B.

The fifth embodiment is different from the first embodiment in that, in addition to the clevis 32, a spherical bush 40 is used, and others have the same configurations as those of the first embodiment.

The spherical bush 40 is provided with an outer peripheral spherical member 40a inside of which a portion of a spherical surface is formed at an outer periphery thereof and a shaft portion 32J of the clevis 32 is fitted in a hole 40b, and a concave member 40c which is connected to the rod 31 and inside of which a portion of a spherical surface having a sphere radius equal to the sphere radius of the outer peripheral spherical member 40a or slightly larger than the outer peripheral spherical member 40a so as to be able to slide on the spherical portion 40a is formed. As shown in FIG. 11A, since the shaft portion 32J of the clevis 32 is fitted in the hole 40b of the spherical bush 40 and the outer peripheral spherical member 40a is inserted into the concave member 40c, the concave member 40c can rotate with respect to the outer peripheral spherical member 40a without selecting a direction within a predetermined range.

As a result, even if the half nut piece 21b is inclined due to a complex movement, the inclination is absorbed by rotation at the spherical bush 40, whereby the occurrence of a bending force in the rod 31 is prevented.

Figure 11B:
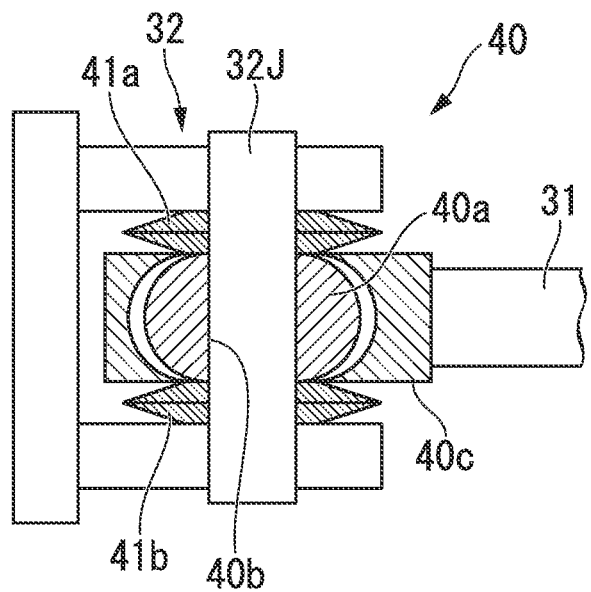
FIG. 11B is a diagram showing a spherical bush constituting a half nut opening and closing device according to a modified example of the fifth embodiment of the present invention.

Further, as shown in FIG. 11B, elastic bodies 41a and 41b such as disc springs may be provided on the top and bottom of the spherical bush 40. Further, instead of the disc springs 41a and 41b shown in FIG. 11B, other spring members such as a coil spring, a lead spring, an air spring, or a liquid spring may be used. Further, the elastic body may be provided at any one of the top and the bottom, rather than both the top and the bottom. In this case, even in a case where inclination occurs in the half nut 21b, whereby the shaft portion 32J of the clevis 32 is deviated from the designed center position which is a functionally most preferable position, a reaction force to return the shaft portion 32J of the clevis 32 to the designed center position can be applied by the elastic bodies 41a and 41b.

Figure 12:
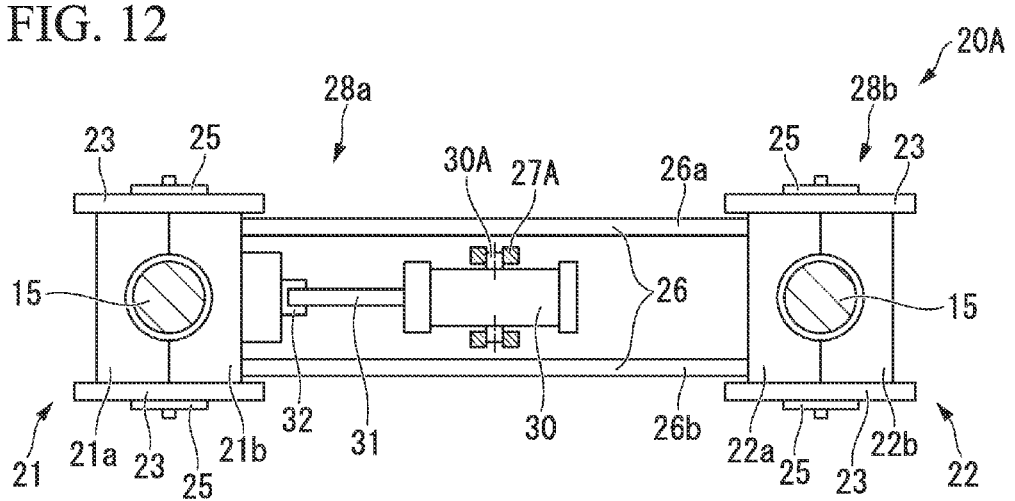
FIG. 12 is a diagram showing a schematic configuration of a half nut opening and closing device according to a sixth embodiment of the present invention.

Next, a half nut opening and closing device 20A according to a sixth embodiment of the present invention will be described with reference to FIG. 12.

The sixth embodiment is different from the first embodiment in that, instead of the bracket 27 connecting the hydraulic cylinder 30 and the two first connecting rods 26a, a bracket 27A is used and the bracket 27A is made so as to be able to rotatably support a support pin 30A protruding from the hydraulic cylinder 30 in the vicinity of the longitudinal center of the hydraulic cylinder 30, and others have the same configurations as those of the first embodiment.

According to the half nut opening and closing device 20A, since the hydraulic cylinder 30 is connected to the half nut piece 21b through the clevis 32 at the tip of the rod 31 and the hydraulic cylinder 30 itself is made so as to be able to rotate at the center in a longitudinal direction, even if large inclination occurs in the half nut piece 21b, the angle of the half nut piece 21b is cancelled by its rotation at the support pin 30A, whereby the occurrence of a bending force in the rod 31 is prevented. In addition, it is preferable that both the devises 32 and 30A be provided. However, the hydraulic cylinder 30 may be supported so as to swing by only the clevis 30A with the clevis 32 omitted.

Figure 13:
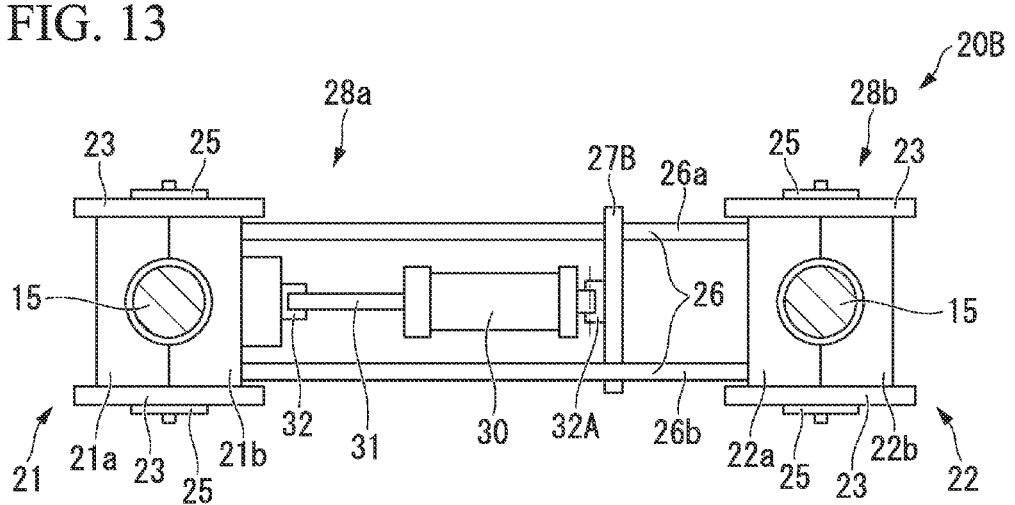
FIG. 13 is a diagram showing a schematic configuration of a half nut opening and closing device according to a seventh embodiment of the present invention.
Figure 14:
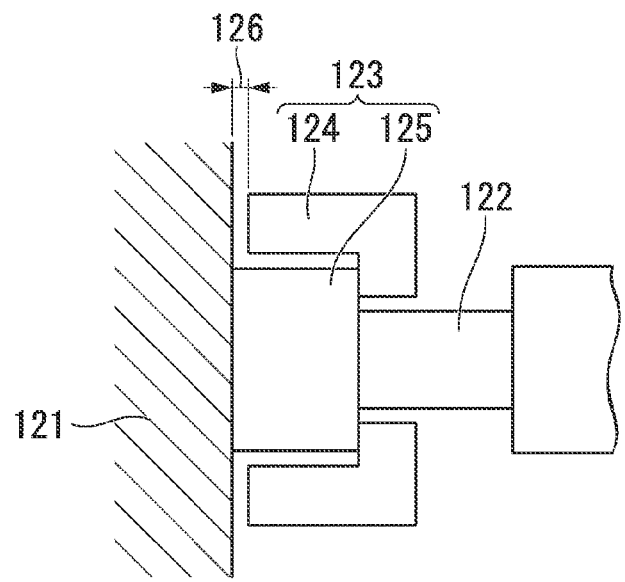
FIG. 14 is a diagram showing an outline of a connection mechanism of a gripping member of the related art.
Figure 15:
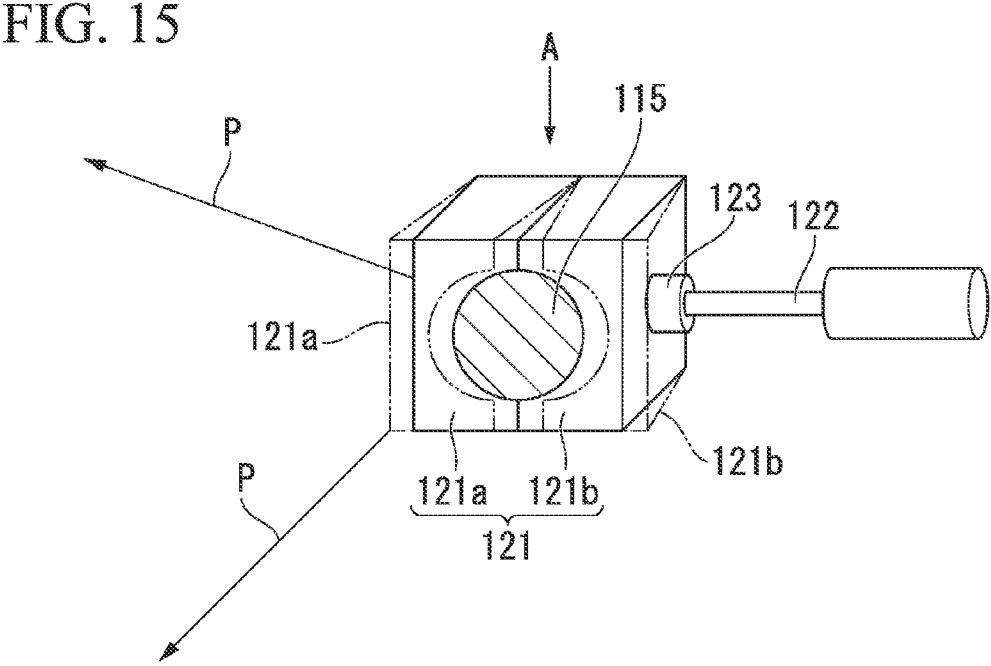
FIG. 15 is a diagram showing the behavior of a half nut in the gripping member of the related art.
Figure 16:
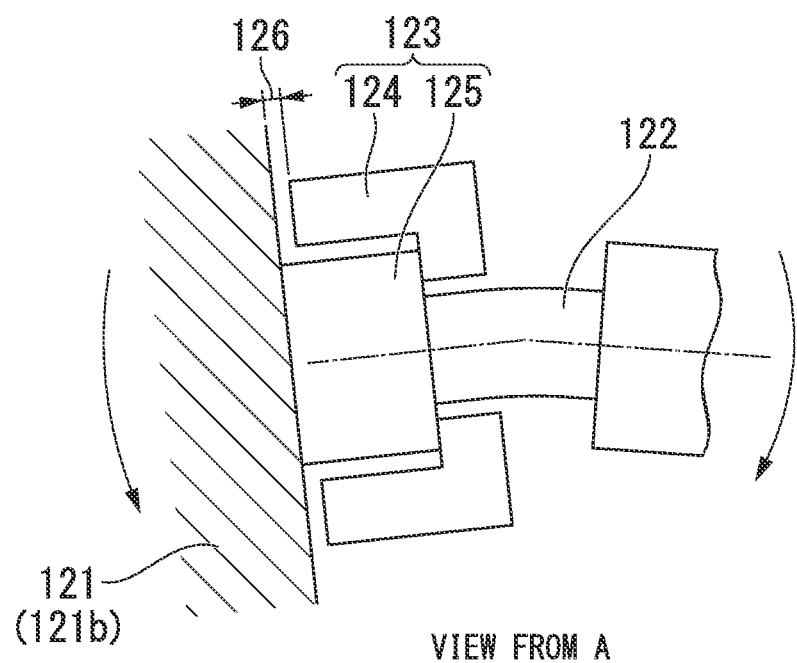
FIG. 16 is a diagram showing the behavior of the connection mechanism of the gripping member of the related art.

Next, a half nut opening and closing device 20B according to a seventh embodiment of the present invention will be described with reference to FIG. 13.

The seventh embodiment is different from the first embodiment in that, instead of the bracket 27 connecting the hydraulic cylinder 30 and the two first connecting rods 26a, a bracket 27B is used and the bracket 27B rotatably supports a rear end portion of the hydraulic cylinder 30 through a clevis 32A, and others have the same configurations as those of the first embodiment.

According to the half nut opening and closing device 20B, even if large inclination occurs in the half nut piece 21b, the angle of the half nut piece is cancelled by its rotations at the devises 32 and 32A, whereby the occurrence of a bending force in the rod 31 is prevented. In addition, it is preferable that both the clevis 32 and the clevis 32A be provided. However, the hydraulic cylinder 30 may be supported so as to swing by only the clevis 32A with the clevis 32 omitted.

The preferred first to third embodiments of the present invention have been described above. However, the present invention is not limited to such examples. It will be apparent to those skilled in the art that various change examples or modification examples can be contemplated within the scope of the technical idea stated in the appended claims, and it is to be understood that these examples naturally also belong to the technical scope of the present invention.

For example, in the embodiments described above, a case where the actuator is the hydraulic cylinder 30 has been described. However, in place of the hydraulic cylinder, a variety of actuators including, for example, an air cylinder and a ball screw type electrically-powered or hydraulically-powered motor may be used.

Further, in the embodiments described above, a case has been described in which the mold clamping device 1 is provided with the four tie bars and the four half nut opening and closing devices 20, 20A, or 20B and is used in an injection molding machine. However, the mold clamping device 1 may be applied to a die cast molding machine instead of the injection molding machine. Further, the present invention may be applied to a mold clamping device having a configuration in which a connecting rod (a connection member) connects three or more half nuts and provided with tie bars exceeding four.

Further, in the embodiments described above, a case has been described in which the hydraulic cylinder 30 and the half nut 21 are made so as to be able to swing by the clevis 32, the connector 33, the spherical joint 34, the universal joint 35, the clevis 32 and the spherical bush 40, the clevis 32 and the bracket 27A, or the clevis 32 and the bracket 27B. However, other swinging members may be used. Further, in the sixth and seventh embodiments, a configuration in which the rod 31 of the hydraulic cylinder 30 and the half nut piece 21b are connected by the clevis 32 is adopted. However, a configuration in which the clevis 32 is not provided is also acceptable.

Further, in the embodiments described above, a case has been described in which the half nut pieces 21a and 22a and the half nut pieces 21b and 22b are respectively connected by the link plates 25 and the operations of the first gripping member 28a and the second gripping member 28b synchronize. However, it is possible to arbitrarily set whether to use the link plate 25. For example, a configuration is also acceptable in which the first gripping member 28a is driven by the hydraulic cylinder 30 and the second gripping member 28b is driven by an actuator other than the hydraulic cylinder 30. Further, synchronization control of the movement of each of the first gripping member 28a and the second gripping member 28b may be performed by electric control instead of the link plate 25.

Further, a case where the hydraulic cylinder 30 is fixed to the first connecting rods 26a has been described. However, the hydraulic cylinder 30 may be mounted on a fixed member such as the guide box 23 which does not move even if the movable platen 12 or the half nut 21a moves, or a member such as the half nut 22a capable of supporting the movement reaction force of the half nut 21a.

Further, the tie bar 15 may be gripped by using a member capable of being divided into three or more, instead of the half nut 21 or 22.

Further, a member which is mounted on the clevis 32 is set to be the rod 31. However, if room is present in a space around the clevis 32, a configuration may be adopted in which, rather than the rod 31 being supported on the clevis 32, a clevis support structure (not shown) is provided at a main body end surface portion of the hydraulic cylinder 30, thereby supporting the clevis 32, and the rod 31 is connected to the bracket 27.

Further, in the embodiments described above, a case has been described in which the first gripping member 28a and the second gripping member 28b respectively have the two connecting rods 26a and the two connecting rods 26b and the connecting rods 26a of the first gripping member 28a and the connecting rods 26b of the second gripping member 28b are disposed diagonally in a view of an axis line direction of the connecting rod 26. However, the number of connecting rods 26, the configuration thereof, and whether or not to adopt diagonal disposition can be arbitrarily set.

Further, in the embodiments described above, a case where the first gripping member 28a and the second gripping member 28b are disposed in the horizontal direction has been described. However, the first gripping member 28a and the second gripping member 28b may be disposed in the vertical direction.

Further, in the embodiments described above, a case has been described in which the tie bar 15 is disposed at the fixed platen 11 and the movable platen 12 moves with respect to the tie bar 15. However, the present invention may be applied to, for example, a molding machine made such that the tie bar 15 is allowed to move with respect to the fixed platen 11. In this case, the present invention is provided to the fixed platen 11.

INDUSTRIAL APPLICABILITY

According to the mold clamping and retaining device related to the present invention, since the half nut and the actuator are connected so that the actuator is allowed to swing with respect to the gripping member, whereby it is possible to prevent bending damage of the rod, the mold clamping and retaining device is industrially applicable.

REFERENCE SIGNS LIST

1: mold clamping device
11: fixed platen
12: movable platen
13: fixed mold
14: movable mold
15: tie bar
15a: circumferential groove portion (first locking-shaped portion)
20: half nut opening and closing device (mold clamping and retaining device)
21, 22: half nut
21a, 21b, 22a, 22b: half nut piece
26, 26a, 26b: connecting rod
27A: bracket (swinging member)
28a: first gripping member (gripping member)
28b: second gripping member (gripping member)
30: hydraulic cylinder (actuator)
32, 32A: clevis (swinging member)
33: connector (swinging member)
34: spherical joint (swinging member)
35: universal joint (swinging member)
30A: support pin (swinging member)
40: spherical bush (swinging member)

The invention claimed is:

1. A mold clamping device comprising:
a fixed platen on which a fixed mold is disposed;
a movable platen on which a movable mold that defines a cavity along with the fixed mold is disposed and which is allowed to move with respect to the fixed platen;
a tie bar configured to resist a mold clamping force that is generated between the fixed platen and the movable platen; and
a mold clamping and retaining device configured to grip the tie bar, thereby locking the movable platen and the tie bar,
wherein the mold clamping and retaining device comprises:
a gripping member configured to grip the tie bar;
an actuator disposed on the movable platen or the fixed platen and configured to move the gripping member back and forth with respect to the tie bar; and
a swinging member provided on a tip end of the actuator, said swinging member having a rotation axis in a perpendicular direction, to an axis line of the tie bar and wherein
the actuator is connected to the gripping member so as to be allowed to swing with respect to the gripping member, and is provided so that a direction of a thrust force of the actuator is parallel to a back and forth direction of a movement of the gripping member.

2. The mold clamping device according to claim 1, wherein the gripping member comprises:
two sets of half nuts which are disposed corresponding to two tie bars and which can come into contact with and be separated from the respective tie bars and in each of which a second locking portion that meshes with a first locking portion formed in the tie bar is formed; and
first and second gripping members each configured to connect half nut pieces of the two sets of half nuts in which the second locking portions respond to a movement in the same direction, among the two sets of half nuts, by a connection member, wherein
the first and second gripping members are configured to grip the two tie bars in cooperation with each other.

3. The mold clamping device according to claim 2, wherein each of the first and second gripping members has two sets of connection members, and
the connection members of the first gripping member and the connection members of the second gripping member are disposed diagonally in a view of the first and second gripping members in an axial direction of the connection member.

4. The mold clamping device according to claim 2, wherein the connection member is a connecting rod.

5. The mold clamping device according to claim 3, wherein the connection member is a connecting rod.

6. An injection molding machine comprising: the mold clamping device according to claim 1.

7. An injection molding machine comprising: the mold clamping device according to claim 2.

8. An injection molding machine comprising: the mold clamping device according to claim 3.

9. An injection molding machine comprising: the mold clamping device according to claim 4.

10. An injection molding machine comprising: the mold clamping device according to claim 5.

* * * * *